3,509,066
ATTAPULGITE CLAY DISPERSIONS AND
PREPARATION THEREOF
Daniel A. Jacobs, Metuchen, and Herbert R. Hamill, Iselin, N.J., assignors, by mesne assignments, to Engelhard Minerals & Chemicals Corporation, Edison, N.J., a corporation of Delaware
No Drawing. Filed Oct. 20, 1966, Ser. No. 587,992
Int. Cl. B01j *13/00;* E21b *21/04;* C04b *33/04*
U.S. Cl. 252—313
10 Claims

ABSTRACT OF THE DISCLOSURE

Aqueous attapulgite clay dispersions containing tetrasodium pyrophosphate as a deflocculating agent and a material selected from the group consisting of hydratable magnesia, magnesium hydroxide, aluminum hydroxide and mixtures thereof as a viscosity reducing agent for the clay dispersions.

---

This invention is concerned with aqueous dispersions of a specific type of colloidal clay, namely attapulgite clay. The invention is especially concerned with concentrated aqueous dispersions of colloidal attapulgite clay and to an improved dispersant mixture therefor.

Attapulgite clay (Georgia-Florida fuller's earth) is a unique clay material that is mined extensively in the southwestern portion of the United States. The predominating mineral species of the clay is attapulgite, which is a unique, colloidally dimensioned needle-like crystalline mineral. The attapulgite is associated wtih smaller amounts of ferruginous matter, montmorillonite minerals, calcite and quartz. The latter mineral, especially, tends to be abrasive and along with other gritty matter must be removed for some uses of the clay. Typical chemical analyses of colloidal grades of attapulgite clay appear in Grim's "Clay Mineralogy," 373 (1953). This reference also contains electron micrographs and differential thermal analysis (DTA) curves that serve to distinguish attapulgite from other clays.

Some important applications of colloidal attapulgite clay utilize the ability of the clay to form very thick gels when the clay is dispersed in water at low clay concentrations, e.g., at 2% to 10% clay concentration. One example is the use of attapulgite clay as a thickening agent for drilling muds. Another example is the use of colloidal grades of attapulgite clay as a suspending agent in liquid fertilizer concentrates. When employed for these uses, the incorporation of a small amount of hydratable magnesia or magnesium hydroxide with the clay will bring about a remarkable increase in the thickening properties of the clay. For this reason, a substantial amount of the attapulgite clay that is presently used in commercial drilling muds contains a magnesia additive. Reference is made to U.S. 3,185,642 to E. W. Sawyer, Jr., et al. Magnesia can also be employed to minimize the normally adverse effect of fluid energy grinding upon the thickening powers of colloidal attapulgite clay. Thus, when colloidal grades of attapulgite clay are ground in the presence of magnesia, the fluid energy ground clay has an unusually high aqueous viscosity. This use of magnesia is described in U.S. 3,205,082 to J. B. Buffett. In both instances, the addition of magnesia in amount of about 1% of the clay weight results in a marked enhancement or improvement of the thickening properties of colloidal attapulgite clay and leads to the preparation of more viscous clay-water dispersions than would be obtained in the absence of a magnesia additive.

In marked contrast to the above-described uses of magnesia or magnesium hydroxide to increase the aqueous viscosity of attapulgite clay, is the use of a deflocculating agent (dispersant) with colloidal attapulgite clay to reduce the aqueous viscosity of the clay. The latter agent is employed when it is desirable to produce aqueous clay dispersions which are thin fluids. As one example, clay degritting and/or fractionation processes require the clay material to be well dispersed but fluid in order to facilitate sedimentation of particles of desired size at a satisfactory rate. When the aqueous dispersions must be dried after degritting and/or classification, the wet processing step obviously should be carried out with fluid dispersions containing as high a clay concentration as is consistent with the provision of fluid clay slips or suspensions in order to reduce the drying costs. To illustrate the relationship between water content and clay solids content when operating at high clay solids, it can be pointed out that a 20% solids dispersion of a typical attapulgite clay crude (50% volatile matter) is made up with 280 parts by weight of the crude and 420 parts by weight of water. In order to formulate the same quantity of crude into a 25% solids dispersion, only 280 parts by weight of water would be added to the clay. Therefore, 50% less water would have to be evaporated from the 25% solids dispersion than from the 20% solids dispersion in order to dry the dispersion to the same water content. This suggests the practical importance of formulating clay dispersions at high solids when water must be removed from the clay in a subsequent operation.

The production of low density attapulgite products, such as the absorbents described in U.S. 3,049,449 to Allegrini or the preparation of filter aid powder obtained by the process of Reissue 25,464 to J. B. Duke et al., are other examples of processes wherein it is desirable to minimize the aqueous viscosity of concentrated slips of colloidal attapulgite clay. In the carrying out of these processes, fluid dispersions are produced as intermediates, using clay deflocculating agents to realize the required fluidity. These dispersions are subsequently dried quiescently and then calcined, in the case of filter aid manufacture. To reduce the load on the dryers during the quiescent drying step, it is obviously desirable to produce fluid slips having a minimum water content.

When it is desirable to obtain high solids fluid slips of attapulgite clay, it is common practice to select tetrasodium pyrophosphate as the deflocculating agent. This particular condensed phosphate salt permits the formation of higher solids fluid dispersions of attapulgite clay than can be obtained with other deflocculating agents. Fluid slips of 18% to 20% concentration can be produced from most attapulgite clay crudes by dispersing the clay in the presence of about 1% to 3% tetrasodium pyrophosphate. In the absence of the tetrasodium pyrophosphate, thick gels would be obtained using only half as much clay. Sodium hydroxide can be employed to enhance the deflocculating action of tetrasodium pyrophosphate and obtain more concentrated slips. When tetrasodium pyrophosphate is used in combination with sodium hydroxide and the dispersion of the clay is carried out at elevated temperature, fluid slips in excess of 25% attapulgite clay concentration have been produced. Even these slips, however, tend to thicken and gel with standing and are limited to uses wherein the eventual thickening is not detrimental. Thus, typical 20% solids slips deflocculated with tetrasodium pyrophosphate or 25% solids slips deflocculated with the combination of sodium hydroxide and tetrasodium pyrophosphate cannot be degritted by simple sedimentation since the grit will not setle out or sediment at a practical rate. To degrit these dispersions, the slips must be screened to remove coarse grit and the slips are then centrifuged. Since the grit in the clay is highly abrasive, screen-wear occurs and the degritting step is significantly more expensive than it would be if the grit could be eliminated by simple sedimentation techniques without the need for screens and/or centrifuges.

An object of the present invention is to modify the effectiveness of tetrasodium pyrophosphate as a deflocculating agent for colloidal attapulgite clay in a manner such that aqueous dispersions of the clay are more fluid than they would be with prior art clay deflocculating agents.

A specific object is to increase the fluidity (decrease the viscosity) of concentrated aqueous dispersions of colloidal attapulgite clay.

Another object is to provide a novel dispersant mixture for attapulgite clay.

Still another object is to provide highly concentrated deflocculated aqueous attapulgite clay dispersions which are more fluid at the clay concentration employed than prior art dispersions of similar clay concentration.

Another object is to provide a method for degritting concentrated attapulgite clay dispersions by sedimentation.

Briefly stated, in accordance with the present invention an improved dispersant mixture for colloidal attapulgite clay is provided by the specific combination of tetrasodium pyrophosphate and a finely divided polyvalent metal compound selected from the group consisting of hydratable magnesia, magnesium hydroxide, aluminum hydroxide, and mixtures thereof. The presence of the polyvalent metal oxide or hydroxide material with the tetrasodium pyrophosphate brings about a remarkable increase in the fluidity of tetrasodium pyrophosphate deflocculated aqueous attapulgite clay dispersion as compared with (a) an identical or substantially identical dispersion formulated with the tetrasodium pyrophosphate as the sole dispersant, or (b) an identical or substantially identical dispersion formulated with the combination of tetrasodium pyrophosphate and sodium hydroxide. Further, the concentrated dispersion can be produced without heating the ingredients during the dispersion step.

The fluidizing effect of the polyvalent metal compound on the condensed phosphate deflocculated clay dispersion can be utilized to permit hydraulic degritting and/or classification of attapulgite clay at higher clay solids than have been considered practical heretofore. The thinning effect of the magnesium compounds or the aluminum hydroxide can be employed to produce attapulgite clay products that are very low in grit by simple sedimentation without the need for metal screens and centrifuges since grit sediments at an extremely rapid rate and to a very great extent when the additive is present with the condensed phosphate salt. In fact, the remarkable effect of magnesia on a tetrasodium pyrophosphate deflocculated slip of attapulgite clay was observed initially when it was noticed that a copious dark, gritty sediment formed substantially immediately when magnesia was added to a condensed phosphate deflocculated slip of an attapulgite clay crude. This indicated that the clay dispersion had an unusually low viscosity since settling particles obey Stokes' law and settle at a rate that varies directly with viscosity of the suspending medium. Thus, an important aspect of the invention is concerned with an improved method for degritting and refining attapulgite clay.

The effect of the magnesia, magnesium hydroxide or aluminum hydroxide can also be utilized to decrease the heating requirements in carrying out the quiescent drying step of the processes described in the aforementioned patents to Duke and Allegrini since very high solids dispersions can be prepared without the need for heat. In contrast, when sodium hydroxide is used with the tetrasodium pyrophosphate, the clay slip must be heated during the dispersion step.

In view of the well-known prior art practice of adding magnesia to colloidal attapulgite clay to increase the viscosity of drilling fluids thickened with the clay and the antithetical use of tetrasodium pyrophosphate with the same clay material to decrease its aqueous viscosity, it was surprising and very unexpected to discover that a similar quantity of magnesia had the diametrically opposite effect on the aqueous viscosity of colloidal attapulgite clay when it was employed in combination with the tetrasodium pyrophosphate. The discovery was also surprising in view of the fact that magnesia increases the low shear viscosity of concentrated condensed phosphate deflocculated slips of kaolinitic clay.

The reason underlying the difference in kind between the effect of magnesia on the aqueous viscosity of attapulgite clay when employed with tetrasodium pyrophosphate and the effect of the magnesia on the aqueous viscosity of the attapulgite clay when employed without the condensed phosphate compound is not presently understood.

The fact that other alkaline earth hydroxides, i.e., calcium hydroxide and barium hydroxide, do not produce the same effect as the magnesium or aluminum compounds when they are used with tetrasodium pyrophosphate, tends to rule out several simple explanations, as does the fact that magnesia does not produce the same result when used with sodium hexametaphosphate, which is another common clay deflocculating agent.

More specifically, the present invention is especially applicable to the processing of attapulgite clay crudes, i.e., clay that has been refined only to the extent that coarse lumps and debris has been removed. The clay that is employed can be dried, although it should not be dried to the extent that the native colloidal properties of the clay are seriously impaired or even eliminated, i.e., the clay should have a free moisture content of at least about 7% after drying. (Free moisture is defined as the weight percent of a material eliminated by heating the material to constant weight at 220° F.) Preferably, the clay has an F.M. of at least 10% and a volatile matter (V.M.) of 20% to 50%. (Volatile matter is defined as the weight percent of a material eliminated by heating the material to essentially constant weight at 1800° F.) There is no upper limit to the F.M. of the clay, although usually it will not exceed 25% so as to avoid the expense of shipping large quantities of water.

When processing the crudes, the present invention can be practiced to obtain the benefit of being able to degrit the crude or degrit and hydroclassify the crude rapidly and at high solids levels, for example, at 15% to 30% solids. The resulting degritted slips, especially after being fractionated to remove plus 2–3 micron material, are especially suitable for use as the fluid slip in producing the filter aid product in accordance with the procedure of said patent to Duke et al. since the fluid slips can be produced at the high solids, e.g., 20% to 30%, without the need for heat. The use of the high solids slips also reduces drying costs in the subsequent processing.

The term "clay solids" as used herein refers to the weight percent of volatile free (V.F.) clay in a dispersion and is calculated as follows:

$$\text{Percent clay solids} = \frac{\text{V.F. clay weight} \times 100}{\text{weight water} + \text{V.F. clay weight}}$$

It is also within the scope of the invention to dilute the dispersions of the present invention for purposes of subsequent fractionation, purification, etc.

Certain benefits of the invention are realized when the principles and practices are applied to colloidal grades of attapulgite clay which have already been purified, such as wet-degritted clay, wet-degritted hydraulically classified clay, dry-degritted clay, or dry-degritted fluid energy ground colloidal attapulgite clay. Even with these refined clays, the use of the dispersant mixture of the invention permits the preparation of more fluid dispersions than could be obtained at similar clay levels.

In carrying out the invention, the colloidal clay should be in the form of mesh size granules or a powder obtained by mildly drying the clay, crushing and grinding.

The particulate clay is added to an aqueous solution of tetrasodium pyrophosphate with the high shear agitation normally employed to disperse attapulgite clay. A Waring Blendor is suitable for small batch processes. A colloid mill, recirculating pump or impeller agitator can be employed in larger scale operations. The polyvalent metal oxide or hydroxide is preferably also present in the water with the tetrasodium pyrophosphate during the agitation and dispersion of the clay. However, in some cases, especially with very concentrated slips, a distinct thinning effect is realized by adding the polyvalent metal oxide or hydroxide additive to the tetrasodium pyrophosphate deflocculated dispersion.

A conventional quantity of tetrasodium pyrophosphate is employed in practicing the invention. This quantity is sufficient to produce an apparently deflocculated clay water system (i.e., a system characterized by the absence of apparent flocs). The quantity of tetrasodium pyrophosphate is generally within the range of 1% to 3% of the volatile free clay weight; most usually it is within the range of 1¾% to 2¼% of the volatile free clay weight. It is well known that the dispersant demands of attapulgite clay products vary with crudes of different origin and may vary significantly with crudes from different locations in the same mine.

Magnesia and magnesium hydroxide are the preferred polyvalent metal oxide compounds when the clap dispersions are expected to undergo aging or standing for long periods of time. The magnesium compounds result in dispersions which generally remain fluid for longer periods of time than dispersions made with the aluminum hydroxide additive. With a representative attapulgite clay crude, the incorporation of 1% magnesia into a 20% solids dispersion containing 2% tetrfasodium pyrophosphate resulted in a system that remained fluid after standing over a month. (The percentages are based on the volatile free clay weight.) With 1% aluminum hydroxide substituted for the magnesia, the 20% solids dispersion gelled slightly after one week. With 1% sodium hydroxide, in accordance with prior art practice, the system was a solid gel after standing one week.

The polyvalent metal oxide compound, or mixture thereof, is employed in amount within the range of about ¼% to about 1½% of the volatile free clay weight. Especially good results are usually achieved with ½% to 1¼% additive. Using appreciably less than ¼%, the benefits may not be as noticeable as when larger quantities are used. Employing appreciably more than 1½%, the additive may tend to thicken the system. Using aluminum hydroxide, the pH of the slip is typically about 9. With magnesia or magnesium hydroxide, pH may be about 10. Sodium hydroxide can also be present in the slip when it is desired to produce slips having a higher pH or when the slip is employed in the preparation of a product or intermediate in which the presence of sodium hydroxide is desirable.

It is essential to employ the polyvalent metal compound as a base since analogous magnesium salts and/or aluminum salts do not produce equivalent results. In fact, polyvalent metal salts, exemplified by magnesium chloride, tend to increase substantially the aqueous viscosity of condensed phosphate deflocculated attapulgite clay dispersions.

The basic polyvalent metal compound can be in the form of a powder or it can be introduced in the form of an aqueous slurry when the addition of water will not increase the water content of the clay dispersion to an undesirably high level.

The magnesia that is employed can be prepared by calcining (burning) magnesite, magnesium hydroxide or magnesium basic carbonate at a temperature within the range of about 400° C. to 900° C. This type of magnesia is called "caustic-burned magnesia." Magnesium hydroxide and hydratable oxide from sea water and brines can be employed. Mineral forms of hydrated magnesia, i.e., brucite, can be used.

The alumina can be an alumina gel, an aluminum sol, or crystalline aluminum hydroxide. For economic reasons, the use of finely divided crystalline alpha trihydrate is preferred. These materials are available commercially as the hydrated aluminas of the "C-30" and "C-700" series. Typical properties of "C-31" aluminum hydroxide are as follows: Chemical analysis (dry weight basis): $Al_2O_3$—64.9%; $Na_2O$—0.35%; Combined water—34.7%; Cumulative screen analysis, minus 325 mesh—60–80%; plus 200 mesh—0.8%; Bulk density, loose—60–70 lbs./ft.$^3$; Surface area—0.1 m.$^2$/g.

The following examples are given to illustrate the practice of this invention and to point out some of its advantages and features.

A typical chemical analysis of the attapulgite clay employed in the examples is as follows:

|  | Percent (V.F. wt. basis) |
|---|---|
| $SiO_2$ | 67.0 |
| $Al_2O_3$ | 12.5 |
| MgO | 11.0 |
| $Fe_2O_3$ | 4.0 |
| CaO | 2.5 |
| Others | 3.0 |
|  | 100.0 |

All of the water used in the illustrative examples was commercially deionized water that had been treated with cation and anion exchange resins.

EXAMPLE I (A) In accordance with prior art practice, 420 ml. of the deionized water was added to a one-quart capacity Waring Blendor. Tetrasodium pyrophosphate was added in amount of 2.8 grams (corresponding to 2.0% of the volatile free weight of the clay to be added). Then, 1.4 grams of sodium hydroxide was added (corresponding to 1.0% of the volatile free clay weight). To dissolve the condensed phosphate and sodium hydroxide, the Waring Blendor was run at low speed for one minute. While the Waring Blendor was being run at the low speed, 280 grams of crushed (about minus 1 inch) crude attapulgite clay was gradually added. The clay was a core composite from a mine near Attapulgus, Ga. The sample had a volatile matter content of 50% (140 grams of volatile free clay was present in the 280 gram sample). After all of the clay crude had been added, the Waring Blendor was operated for five minutes at low speed. The speed was then increased to high speed and maintained at the high speed for five minutes. The contents of the Waring Blendor, which was a 20% solids dispersion of the clay crude, were placed in a quart jar which was then sealed. It was observed that the sample was slightly gelled and that a small amount of dark, coarse sediment was present on the bottom of the jar. After standing one week, the contents further gelled but the quantity of dark sediment did not increase perceptibly.

(B) In accordance with the present invention, the procedure of part (A) of this example was repeated, substituting 1.4 grams of powdered, high purity magnesium hydroxide for the same quantity of sodium hydroxide employed in the previous test. It was observed that the 20% solids slip was very fluid, in contrast to the slip produced with sodium hydroxide which was gelled. It was also observed that a copius black sediment had deposited on the bottom of the slip after the slip had stood for ten minutes, indicating that more grit formed as a sediment when the magnesium hydroxide was employed during the dispersion step than when sodium hydroxide was used.

EXAMPLE II

In the previous tests, the clay solids were at the 20% level. In this test, the effect of magnesium hydroxide at higher solids (25%) was evaluated by repeating Example IB and reducing the quantity of water to 280 milliliters.

In other words, the dispersion contained: clay, 140 grams (dry) or 280 grams (as is); water, 280 milliliters; tetrasodium pyrophosphate, 2.8 grams; magnesium hydroxide, 1.4 grams.

The slip was as fluid as the slip in IB in spite of the fact that it contained 25% solids. This was surprising since with sodium hydroxide (IA), the slip was lightly gelled at only 20% solids and contained 140 milliliters less water. A small amount of black sediment appeared, the amount being less than when the clay was dispersed with the magnesium hydroxide dispersion adjuvant at 20% solids. This indicated that the 20% solids formulation was more suitable than the 25% solids formulation for grit sedimentation purposes under the conditions of the test.

EXAMPLE III

This examples illustrates the application of the invention to the degritting and particle size fractionation of a clay crude. In this example, the high solids dispersion was diluted before degritting in order that degritting could be carried out simultaneously with the removal of plus 3 micron matter by sedimentation. This example further illustrates an application of the process of the invention to the preparation of low bulk density absorbent products by the quiescent drying process of U.S. 3,049,449 to Allegrini.

A core sample of a crude attapulgite clay (61.69% solids) was used in the test. The crude was from a mine near Attapulgus, Ga.

Zeolite deionized water (432 grams) was placed in a quart capacity Waring Blendor. To the Blendor, tetrasodium pyrophosphate was added in amount of 2.8 grams, following which 1.4 grams of powdered magnesium hydroxide was added. While the Blendor was operated at low speed, 227 grams of the crushed crude was gradually added. The contents were agitated for five minutes at low speed and then for five minutes at high speed.

The resulting slip, which was very thin and fluid, was poured into a half gallon jar. To the jar, 700 milliliters of deionized water was added and the contents were agitated for five minutes. The resulting dispersion was permitted to settle for a time (5 hrs., 3 min.) calculated to permit settling of all plus 3 micron particles.

The supernatant layer containing minus 3 micron material was poured into "Pyrex" pans using a sufficient number of pans to form thin layers of the liquid in each pan. The thin layers of the clay dispersion were permitted to oven dry at 175° F. The dried material weighed 100 grams and formed a smooth dry clean cake.

The sediment (the residue after the supernatant was removed) was reslurried with water and allowed to settle five hours. The cake weight was 40.7 grams. The remaining grit was washed and found to weigh 14 grams, representing about 10% of the volatile free weight of the starting clay.

The abrasion value index of the degritted clay was determined by the "Valley" procedure described in U.S. 3,014,836 and found to be 23. In contrast, representative attapulgite clay crude that is dispersed at 20% solids in the 2% tetrasodium pyrophosphate and 1% sodium hydroxide and is degritted in a centrifuge operated under conditions calculated to remove all material plus about 3 microns will have a relatively high abrasion index of about 106. This comparison is a further indication of the value of using a magnesia additive with tetrasodium pyrophosphate when degritting attapulgite clay.

EXAMPLE IV

The procedure of Example III was repeated with aluminum hydroxide (Merck's "Reagent Grade"). In this case, the slip was very fluid and grit settled extremely rapidly. The minus 3 micron fraction weighed 82 grams and formed a rough, paperlike cake with apparent fibers after being quiescently dried. After reslurrying the sediment and siphoning off the top layer, the grit residue was washed and weighed. In this case, 21.5 grams of grit was obtained, representing 15% of the volatile free clay weight. The degritted clay had a Valley abrasion index of 24.

EXAMPLE V

This example illustrates the use of hydratable magnesia in the process of the invention. The procedure of Example III was repeated with the 61.69% volatile matter core composite. To 433 milliliters of deionized water in a one quart Waring Blendor, 2.8 grams of tetrasodium pyrophosphate was added. 1.4 grams of powdered hydratable magnesium oxide was then added and mixed in the Blendor at low speed. 227 grams of the clay (140 grams volatile free clay) was added and the contents stirred at low speed for five minutes and then at high speed for five minutes.

The dispersion, which had a pH of 10.4, was distinctly fluid and grit settled rapidly. The slip gelled slightly after standing for 2 hours.

EXAMPLE VI

To study the effect of other alkali and alkaline earth hydroxides and oxides on tetrasodium pyrophosphate deflucculated dispersions of attapulgite clay, the procedure of Example III was repeated with the exception that barium hydroxide, barium oxide or calcium hydroxide was substituted for the hydratable magnesium oxide. All dispersions were formulated at 20% solids and contained 140 grams volatile free clay crude (277 grams "as is"), 433 grams water, 2.8 grams tetrasodium pyrophosphate and 1.4 grams of the oxide or hydroxide.

The results, tabulated below, show that barium hydroxide, barium oxide, lithium hydroxide and calcium hydroxide increased the viscosity of tetrasodium pyrophosphate deflocculated dispersions of colloidal attapulgite clay. In other words, the effect of these materials was directly opposite to that of magnesia, magnesium hydroxide or aluminum hydroxide. The results show also that the polyvalent metal oxide compounds, especially the calcium compound, increased the viscosity of the dispersions to the greatest extent. None of the additives fluidized the tetrasodium pyrophosphate deflocculated clay dispersions and none facilitated degritting at high solids as did the magnesium and aluminum compounds of the previous examples.

TABLE—EFFECT OF VARIOUS ALKALI AND ALKALINE EARTH HYDROXIDES ON VISCOSITY OF TETRASODIUM PYROPHOSPHATE DEFLOCCULATED DISPERSIONS OF ATTAPULGITE CLAY

| Additive | Effect |
| --- | --- |
| Barium hydroxide | Slip fluid, but grit did not settle on the bottom. Slip started to gel after one hour. |
| Barium oxide | Slip fluid, but grit did not settle. Some gelling after ½ hour. |
| Lithium hydroxide | Slip more fluid than with barium compounds, but no grit settled. Slip began to gel in 15 minutes. |
| Calcium hydroxide | Slip gelled in Waring Blendor after 4 minutes high speed agitation. |

Thus, it has been pointed out that the aqueous viscosity of colloidal attapulgite clay dispersions can be increased or decreased by carrying out the dispersion of this type of clay in the presence of suitable additives, for example, magnesia or magnesium hydroxide, to thicken the dispersions or, to obtain the opposite effect, a condensed phosphate salt, to deflocculate and fluidize the dispersions. The examples given hereinabove demonstrate that in spite of the fact that magnesia or magnesium hydroxide per se tend to increase the aqueous viscosity of attapulgite clay, the combination of the magnesia, magnesium hydroxide or aluminum hydroxide with tetrasodium pyrophosphate surprisingly produces thinner dispersions than are obtained with tetrasodium pyrophosphate per se and that other polyvalent metal oxide and hydroxides differ in kind from the magnesium and aluminum compounds in this respect.

We claim:

1. In a process for dispersing colloidal attapulgite clay in water wherein said clay is agitated in water in the presence of tetrasodium pyrophosphate deflocculating agent, the improvement which comprises incorporating in said water a small amount of a polyvalent metal compound selected from the group consisting of hydratable magnesia, magnesium hydroxide, aluminum hydroxide and mixtures thereof, said amount being sufficient to produce a dispersion that is less viscous than the dispersion would be in the absence of said polyvalent metal oxide compound.

2. The process of claim 1 wherein said clay is a crude clay.

3. The process of claim 1 wherein tetrasodium pyrophosphate is employed in amount within the range of 1% to 3% of the volatile free clay weight and said polyvalent metal oxide material is employed in amount within the range of ½% to 1½% of the volatile free clay weight.

4. The process of claim 3 wherein the clay solids is within the range of 15% to 30% by weight.

5. The process of claim 3 wherein the clay solids is within the range of 20% to 25% by weight.

6. The process of claim 1 wherein said polyvalent metal oxide compound is present with said water while said clay is agitated therein.

7. The process of claim 1 wherein said polyvalent metal compound is hydratable magnesia.

8. The proces of claim 1 wherein said polyvalent compound is magnesium hydroxide.

9. The process of claim 1 wherein said polyvalent metal compound is crystalline alpha alumina trihydrate.

10. A fluid clay dispersion comprising water, colloidal attapulgite clay dispersed therein in amount of about 15% to 30% by weight, volatile free clay weight basis, tetrasodium pyrophosphate deflocculating agent in amount within the range of 1% to 3% of the volatile free clay weight and from ¼% to 1½% of the volatile free clay weight of a material selected from the group selected from hydratable magnesia, magnesium hydroxide, aluminum hydroxide and mixtures thereof.

References Cited
UNITED STATES PATENTS

| | | | |
|---|---|---|---|
| Re. 25,463 | 10/1963 | Duke et al. | 23—110 |
| 3,050,863 | 8/1962 | Allegrini et al. | 23—110 X |
| 3,185,642 | 5/1965 | Sawyer et al. | 252—8.5 |
| 3,205,082 | 9/1965 | Buffett | 106—72 |

HERBERT B. GUYNN, Primary Examiner

U.S. Cl. X.R.

23—110; 106—72, 288; 209—5, 162, 208; 252—8.5, 455